April 10, 1962 V. A. BLAES ETAL 3,029,046
EXPANDABLE TIP FLOAT
Filed July 15, 1959

INVENTORS
*VIGGO A. BLAES*
*MAURICE G. SCHEIDER*

BY *R. J. Tompkins*

ATTORNEY

3,029,046
EXPANDABLE TIP FLOAT
Viggo A. Blaes, Pikesville, and Maurice G. Scheider, Bel Air, Md., assignors, by mesne assignments, to the United States of America as represented by the Secretary of the Navy
Filed July 15, 1959, Ser. No. 827,408
4 Claims. (Cl. 244—105)

The present invention relates to an expandable tip float designed primarily for use in aircraft and more particularly to a tip float which may be expanded or retracted when so desired. The float is best suited for emplacement on the lower surface of a seaplane to provide stabilization.

Heretofore, seaplanes have been designed with provisions for static lateral stability which usually consists of fixed or retractable wing tip floats, or hull sponsons. Such devices are satisfactory for subsonic flight speeds where the aerodynamic performance is not severely compromised. At the present time, however, water-based aircraft capable of supersonic speeds are being produced. The use of tip floats at such speeds results in unacceptably large performance losses. Moreover, the physical thickness of the wings is too small to permit stowage of a tip float or similar device. The present invention fills the need for a float on a thin-winged aircraft by the use of a blanket which may be expanded or retracted by means of a pneumatic system and does not hinder the aircraft performance in the air.

An object of the present invention is the provision of a float on each wing of a seaplane to improve stabilization and buoyancy.

Another object is to provide a tip float which is expandable and retractable.

A further object of the invention is the provision of a pneumatic system for moving a tip float into operative position.

A final object is to provide a tip float which does not hinder the operating performance of an aircraft.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
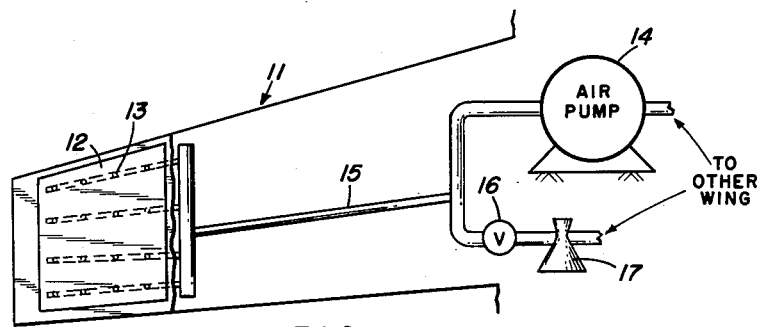
FIG. 1 shows a partly diagrammatic and broken bottom plan view of the apparatus.
Figure 2:
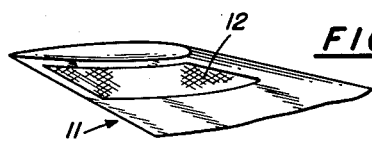
FIG. 2 illustrates the device in deflated position.
Figure 3:
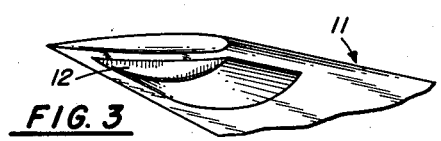
FIG. 3 is a view of the device in inflated, operative position.

Referring now to the drawings, wherein like reference characters designate like or corresponding parts throughout the several views, there is shown in FIG. 1 the bottom surface of an aircraft wing 11. A blanket 12 is attached to the bottom surface and near the tip of the wing. A rubberized cloth, rubber and metal, or an all-metal material may be used in forming the blanket provided that the material is capable of expansion. The amount of volume expansion of the blanket is precalculated so as to provide the required righting moment while the aircraft is resting on water. As stated above, seaplanes having a potential supersonic speed must necessarily have a relatively thin wing and consequently, difficulty arises in stabilizing the seaplane when resting on water. For this reason, the blanket 12 is inflated immediately after the aircraft alights. This is accomplished by the use of a series of holes 13 in the bottom surface of the aircraft wing, which are individually connected to an air pump 14 via a manifold 15. Included in the manifold system is a valve 16 and a venturi 17. The air pump 14 forces air through the manifold system and expands the blanket to the desired volume as shown in FIG. 3. An additional blanket 12 is located on the other wing and is expanded simultaneously by use of the same air pump 14 and system. For deflation of each blanket, the valve 16 is opened so that the air may escape from the blanket and through the manifold 15. The venturi 17 is positioned within the manifold system so that a high negative pressure is maintained behind the blanket during flight of the aircraft, thus keeping the blanket in flush alignment with the bottom surface of the wing for minimum protrusion, as shown clearly in FIG. 2.

Figure 4:
FIG. 4 illustrates a modification of the device.

A second embodiment of the invention is shown in FIG. 4 wherein individual blankets 18 covering a single hole are provided. Since the surface area of the total number of blankets is far greater than that of a large, single blanket, the buoyancy of the smaller blanket is greater.

In either embodiment, the pumping procedure may be reversed for speeding up the deflation process when the rate of escape of the air through valve 16 is too slow. This is accomplished by reversing the pump 14 and thereby increasing the rate of air emission through the valve 16.

Obviously many modifications and variations of the present invention are possible in the light of the above teachings. It is therefore to be understood, that within the scope of the appended claims, the invention may be practiced otherwise than as specifically described.

What is claimed is:

1. In combination with a supersonic seaplane having relatively thin wings, inflatable means fixedly secured to the underside of said wings, said inflatable means attached to said wings about its periphery and forming a pocket between said inflatable means and the underside of said wings, a plurality of apertures in the underside of said wings located within the area enclosed by said inflatable means, a manifold system operably connected to said apertures in said wings, pressurizing means connected to said manifold system for supplying air thereto thence to said apertures and said pocket inflating said inflatable means, valve means for releasing the pressure in said inflatable means, a first positive means for evacuating said inflatable means, a second positive means for accelerating the evacuation of said inflatable means, said first positive evacuating means maintaining said inflatable means under a continuously high negative pressure during flight whereby said inflatable means is deflated during flight to reduce the aerodynamic drag on said aircraft and inflated prior to landing to increase the buoyancy of said aircraft when in contact with a body of water.

2. In combination with a supersonic seaplane having relatively thin wings, a plurality of apertures in the underside of said wings near the top thereof, a reversible air pump operably connected to a manifold system for supplying air under pressure to said apertures, flexible means fixedly secured to the underside of said wing, said flexible means covering said apertures and forming an air tight pocket between the underside of the wing surface and said flexible means, said flexible means being normally flush with the exterior of the underside of said wing, valve means in said manifold system for controlling the admission of air into and the evacuation of air from said air tight pocket, a first means for evacuating said air tight pocket, a second means for accelerating the evacuation of said air tight pocket, said first mentioned evacuating means maintaining said air tight pocket under a high negative pressure during high speed flight whereby said flexible member is maintained in a retracted position during flight reducing the drag on said aircraft and when said pump is actuated air is supplied under pressure to said air tight pockets inflating said pockets to increase the buoyancy of said aircraft when in contact with a body of water.

3. The combination of claim 2, wherein said flexible means comprises a single flexible blanket which covers said apertures on each tip of said wing and said apertures are arranged in longitudinal rows throughout the length and width of said blanket.

4. The combination of claim 2, wherein said flexible means comprises an individual blanket for each of said apertures in said undersurface and said apertures are arranged in longitudinal rows and each aperture is completely covered by one of said individual blankets.

References Cited in the file of this patent
UNITED STATES PATENTS

| | | |
|---|---|---|
| 1,489,619 | Tsavaris | Apr. 8, 1924 |
| 2,131,528 | Soyer | Sept. 27, 1938 |
| 2,168,328 | Diehl | Aug. 8, 1939 |
| 2,265,206 | Stampfl | Dec. 9, 1941 |
| 2,444,264 | Morris | June 29, 1948 |